United States Patent [19]

Cassereau et al.

[11] Patent Number: 5,121,191
[45] Date of Patent: Jun. 9, 1992

[54] METHOD AND APPARATUS FOR CODING MOTION PICTURES

[75] Inventors: Philippe M. Cassereau, Nashua, N.H.; Johnathan D. Devine, Boston, Mass.; John C. Huffman, Windham, N.H.; William R. Zettler, Jr., Brookline, Mass.

[73] Assignee: Aware, Inc., Combridge, Mass.

[21] Appl. No.: 669,773

[22] Filed: Mar. 15, 1991

[51] Int. Cl.⁵ .................. H04N 11/04; H04N 9/80; H04N 7/13
[52] U.S. Cl. .................................. 358/13; 358/133; 358/136; 358/339
[58] Field of Search ................. 358/11, 12, 13, 105, 358/133, 135, 136, 339

[56] References Cited

U.S. PATENT DOCUMENTS

| | | | |
|---|---|---|---|
| 4,663,660 | 5/1987 | Fedele | 358/13 |
| 4,785,349 | 11/1988 | Keith | 358/13 |
| 4,827,336 | 5/1989 | Acampora | 358/13 |
| 4,864,398 | 5/1989 | Avis | 358/136 |

Primary Examiner—Howard W. Britton
Attorney, Agent, or Firm—McCubbrey, Bartles, Meyer & Ward

[57] ABSTRACT

A method and apparatus for compressing motion pictures is disclosed. The frames of the motion picture are divided into adjacent groups. Each group is treated as a three-dimensional image. The three-dimensional image is then filtered via a three-dimensional FIR filter to generate three-dimensional component images that are more efficiently quantized. The degree of quantization of each component image is determined in part by the spatial frequencies represented by the component image in question. For motion pictures derrived from interlaced scanning devices, the quantization of specific component images is altered to prevent artifacts.

17 Claims, 8 Drawing Sheets

METHOD AND APPARATUS FOR CODING MOTION PICTURES

BACKGROUND OF THE INVENTION

The present invention relates to methods and apparatuses for reducing the amount of data needed to represent an image, and more particularly, to a novel method and apparatus for compressing motion pictures.

Images are conventionally represented by a two-dimensional array of values in which each value represents a property of the image at a corresponding point on the image. In the case of gray-scale images, a single number representing the gradations of intensity from white to black, referred to as the gray scale, is stored. In the case of color images, each "value" is a vector whose components represent the gradations in intensity of the various primary colors, or some alternative color code, at the corresponding point in the image.

A motion picture comprises a sequence of such images. Typically, thirty or more images are needed for each second of viewing time.

This representation of a motion picture corresponds to the output of a typical image-sensing device such as a television camera. Such a representation is convenient in that it is easily regenerated on a display device such as a CRT tube. However, the number of bits needed to represent the data is prohibitively large for many applications. A single 512×512 gray-scale image with 256 gray levels requires in excess of 256,000 bytes. At 30 frames per second, a communication channel with a bandwidth of approximately 64 million bits per second is needed to transmit the motion picture. A full color 24 bit per pixel motion picture would require a bandwidth of more than 190 million bits per second.

This bandwidth is significantly greater than that available for many communications purposes. For example, high quality consumer telephone lines are typically limited to 64 thousand bits per second. Hence, commercially viable picture telephone systems require some form of image compression.

Image compression systems used in motion picture compression applications make use of the redundancy between frames to reduce the amount of information that must be transmitted over the bandwidth-limited communication link. Many scenes in a motion picture include portions that are constant from frame to frame for several seconds, if not minutes. Prior art compression schemes attempt to divide the scene into the constant portion and the portion that changes from frame to frame.

The constant portion need be sent only once. Hence, if the constant portion comprises a significant fraction of the scene, considerable image compression can be realized. For example, if the entire scene were constant for 10 seconds, the information needed to reproduce the scene would be contained in one frame of the sequence and an indication of the number of times the frame is to be repeated. This would be approximately 1/300 of the information needed if the scene were sent without compression.

To better understand the manner in which this type of prior art image compression operates, consider a motion picture which is being sent over a bandwidth-limited communication link from a transmitter to a receiver. The receiver will be assumed to have a frame buffer which stores one frame of the motion picture. The contents of this frame are then displayed at the receiver. Ideally, the frame in the receiver will exactly match the corresponding frame at the transmitter.

Typically, the process is started by sending one complete frame of the sequence. This frame is referred to as the key frame. After the key frame is sent, successive frames are specified by sending information specifying changes that have occurred relative to the last frame displayed by the receiver. The receiver uses this information to update its frame buffer. If the interframe changes are relatively small, i.e., the scene is almost constant, the available bandwidth will be sufficient to transmit all of the information needed to update the receiver's image. That is, the frame buffer in the receiver will exactly match the corresponding frame of the motion picture at the transmitter.

Unfortunately, the available bandwidth is often insufficient to completely specify all of the interframe changes that have occurred since the last update in 1/30 of a second. Hence, the changes to be sent are prioritized and only the highest priority changes are sent. As a result, errors accumulate in the frame buffer at the receiver. The transmitter keeps track of the magnitude of these errors.

When these errors become sufficiently large, a new key frame must be sent. The time needed to send a key frame is greater than 1/30 of a second. Hence, each time a key frame is sent, the motion will be interrupted for some period of time. For example, at a resolution of 512×512 pixels each requiring 8 bits, a key frame would require between one and two seconds to send at 1.44 Mbps, a data rate typically used in teleconference systems. During this time interval additional frames will have been generated at the transmitter. The corrections needed to bring the receiver frame buffer up to date must be sent as a single large update. The combination of the time delay and the large update results in a noticeable loss of continuity in the motion.

The various errors and motion interruptions become particularly objectionable when the sequence of scenes in the motion picture change rapidly. To minimize these problems, either the bandwidth of the communication channel must be increased or the quality of the picture must be reduced. Providing increased bandwidth increases the cost of transmitting the motion picture, and hence, is to be avoided. Similarly, a reduction in picture quality is also to be avoided.

A second problem with this type of prior art motion picture compression system occurs in systems using interlaced video. In interlaced video systems, successive frames are offset relative to one another by an amount to one half the horizontal line spacing in a frame. Hence, the frames do not "line up" precisely when considered as sequence. Prior art systems do not provide an acceptable method for compensating for this motion. As a result, the decompressed motion picture often appears to have jitter.

Broadly, it is an object of the present invention to provide an improved apparatus and method for compressing motion pictures.

It is a further object of the present invention to provide a method and apparatus which is less sensitive to scene changes than prior art systems.

It is a still further object of the present invention to provide a method and apparatus which is more immune to compression artifacts in interlaced video systems than prior art systems.

These and other objects of the present invention will become apparent to those skilled in the art from the following detailed description of the invention and the accompanying drawings.

SUMMARY OF THE INVENTION

The present invention includes both apparatuses and methods for compressing a motion picture. An apparatus for compressing a motion picture according to the present invention operates on a motion picture comprising a sequence of frames, each said frame comprising a two-dimensional image representing said motion picture at one instant in time. The apparatus includes circuitry for receiving a signal specifying a compression ratio for said motion picture and for receiving signals specifying said frames. A predetermined number $N_f$ of consecutively received frames are stored by the apparatus. These frames are processed by a three-dimensional filter which generates therefrom a plurality of three-dimensional component images. The plurality of three-dimensional component images includes a low-frequency component image and one or more high-frequency component images. Each of the component image comprises a plurality of pixel values. The compression apparatus also includes quantization circuitry for approximating each of the pixel values in at least one of said component images by an approximation having one of a predetermined set of integer values. The precision of said integers depends on the statistical distribution of the pixel values in said component image and said received compression ratio. These pixel approximations specify an approximation to the original $N_f$ frames of the motion picture. In the preferred embodiment of the present invention, the pixels of the low-frequency component image are approximated to a precision not less than the statistically optimum precision determined by said statistical distributions of said pixels in the component images and the received compression ratio and the pixels of at least one of said high-frequency component images are approximated to a precision not greater than the statistically optimum precision determined by the statistical distribution of the pixels in the component images and the received compression ratio.

In the embodiments of the present invention in which color motion pictures are compressed, additional compression is obtained by compressing the chrominance signals to a greater degree than the luminance signals. In addition, the pixels of the chrominance signals are quantized and/or coded using vector techniques.

By selectively retaining certain high-frequency information, significantly greater compression is obtained for motion pictures in an interlaced format.

DETAILED DESCRIPTION OF THE INVENTION

Figure 1:
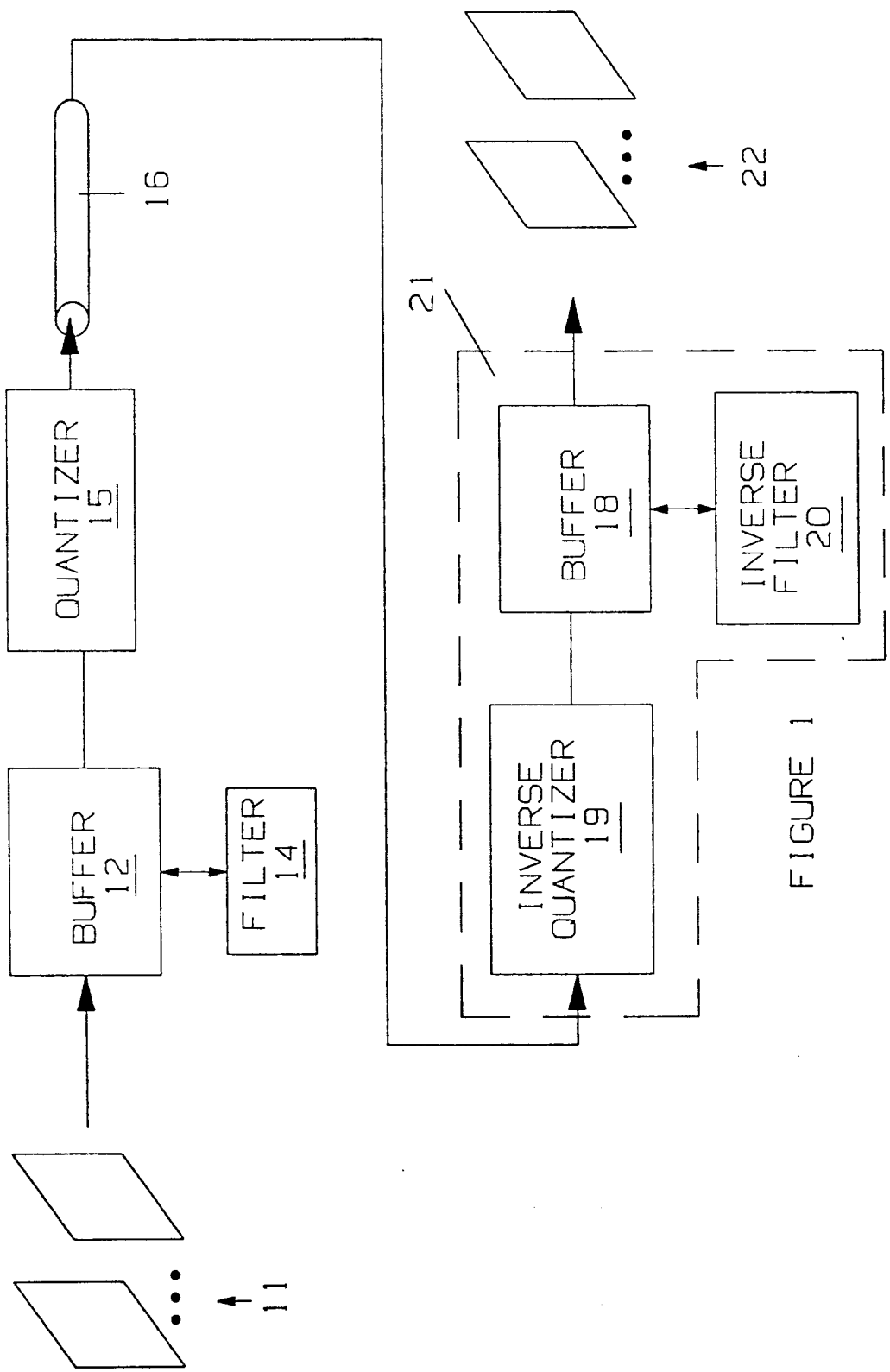
FIG. 1 is a block diagram of a video transmission utilizing the compression technique of the present invention.

To simplify the following discussion, it will be assumed that a monochrome motion picture is to be compressed. The manner in which information specifying color is compressed will be discussed afterward. The compression technique of the present invention may be more easily understood with reference to FIG. 1 which is a block diagram of a video transmission apparatus utilizing the compression technique of the present invention. The motion picture consists of a sequence of two-dimensional images shown at 11. Each image comprises a two-dimensional array of intensity values $I_{x,y}$, where the x and y values correspond to points on a two-dimensional grid. Each array represents the motion picture at some time t. Hence, the motion picture may be represented by a three-dimensional array $I_{x,y,t}$. At any given time, compression apparatus 13 stores and processes a predetermined number of consecutive frames of the motion picture. The stored frames are held in a buffer 12. The stored frames are considered to be a single three-dimensional image.

A three-dimensional perfect reconstruction filter 14 operates on the stored three-dimensional image. The filter may be viewed as creating a number of component images. Each component image has information corresponding to information in specific scales, which correspond approximately to specific spatial frequency bands in the original three-dimensional image. The filtered images may be recombined using an inverse filter to regenerate the original three-dimensional image from the component images provided the filter and its inverse have sufficient numerical accuracy.

It should be noted that the filtering transformation described above does not in itself provide image compression. If the filtered component images are represent to the same precision as the original frames of the motion picture, the number of bits needed to store the filtered component images is the same as that needed to store the original motion picture frames. The actual image compression results from coding operations performed on the different filtered component images.

The process by which the intensity values in the filtered images are coded will be referred to as quantization. Quantizer 15 replaces each suitably normalized intensity value by an integer which approximates the normalized intensity value. The error introduced by this approximation will depend on the range of intensity values and the number of bits allocated to each integer. If the range of intensity values is large, the number of bits needed to adequately approximate the intensity values will be larger than would be the case if the range of intensity values were small.

Consider the pixel values of one of the component images. Each of the pixel values is to be replaced by an integer having a predetermined number P of bits. The integers in question are then transmitted in place of the individual pixel values. At the receiver, the inverse of the mapping used to assign the integer values to the pixel values is used to recover the original pixel values. There are at most $2^P$ distinct values that can be represented; hence, if there are more than $2^P$ different pixel values in the sub-set of pixel values, at least some of the pixel values will not be exactly recovered. The goal of the quantization algorithm is to minimize the overall error rate with respect to a suitable measure of error. Given the statistical distribution of the pixel values and the average number of bits to be allocated to each pixel, the optimum mapping of the pixel values to the integer values in question may be calculated. Since such optimization calculations are well known in the art, they will not be discussed in detail here. For more details of the procedures in question, the reader is referred to William K. Pratt, *Digital Image Processing*, pp. 141–46, John Wiley & Sons, Inc., New York, 1978, which is hereby incorporated by reference.

The overall error in approximating a component image will depend on the statistical distribution of the intensity values in the component images and the degree of image compression needed. The ratio of the number of bits needed to represent the original three-dimensional image to the number of bits in the compressed image will be referred to as the image compression ratio. Once an image compression ratio is set, the total number of bits available for all of the component images is determined. The optimum assignment of the available bits to the various component images is then determined from the statistical properties of the component images. It has been found experimentally that the statistical distributions of the component images generated by the present invention are approximated by Laplacian distributions. Hence, the optimum allocation of the bits may be made from a knowledge of the variance of the pixel values in each component image. Schemes for optimally allocating bits are known to those skilled in the art, and hence, the procedures for converting the observed variances to quantization levels will not be described in more detail. For the purposes of this discussion, a quantization scheme will be defined to be "optimum" if it provides the lowest distortion in the reconstructed image for a given compression ratio. For the purposes of this definition, the distortion is measured in terms of mean-squared-error between the frames of the original motion picture and those of the motion picture obtained after compressing and decompressing the original motion picture. It will be apparent to those skilled in the art that other statistical measures of distortion between the original and reconstructed motion pictures may be used.

In the preferred embodiment of the present invention, the various component images are quantized using a uniform quantization scheme. In such schemes, the intensity of each pixel is transformed into an integer which is equal to the intensity value in question divided by a step size. In general, the step size will vary between component images. In the preferred embodiment of the present invention, the step sizes used for the various component images are determined by assuming a Laplacian distribution for the pixel values. The optimum step sizes are then determined from the variances of the pixels values of the component images, the bits needed to represent the original image, and the desired compression ratio.

The filtering of the three-dimensional image into component images of different spatial and time domain frequencies serves two functions in the present invention. First, the filtering operation reduces the correlation of the pixels in space and time. This reduction in correlation leads to reduced variances, and hence, reduces the number of bits needed to adequately represent the various component images. Most motion picture images are highly correlated both in space and time. Hence, the three-dimensional images generated from a number of consecutive frames will be highly correlated in all three dimensions. If the three-dimensional image can be transformed utilizing a linear transformation in space and time such that the transformed image has reduced correlation, then the variance of the pixels of the transformed image will be less than that of the original image. In this representation, relatively few of the pixels in the transformed image will contain most of the image signal energy, and the remaining pixels will have reduced variance and, hence, can be coded with fewer bits. The filtering operation utilized in the present invention provides this transformation.

It is found experimentally that the lowest frequency component image has a variance at least as large as the original three-dimensional image; however, the various high-frequency images have significantly lower variances. As will be explained in more detail below, the total number of pixels in the various component images is approximately the same as that in the original image. However, the number of pixels in the lowest frequency component image is a small fraction of the total pixels in the transformed image. Hence, even if pixels of the lowest frequency component image are quantized to an accuracy equal to or greater than that of the original image, the more numerous pixels of the various high-frequency component images can be quantized to an accuracy much less than that of the original image. As a result, a net image compression will be obtained.

Second, the filtering operation separates the image information into subsets which have different subjective value to a human observer. The three-dimensional images processed by the present invention have two spatial dimensions and one time dimension. It is known from the study of human vision that low spatial frequency information is more important to a viewer than high spatial frequency information when viewing still photographs. It is also known from the study of vision that the human eye cannot resolve fine detail in moving objects. Hence, objects in an image that are moving can be displayed with lower precision than stationary objects. Thus, the time dimension behaves in the same manner as the spatial dimensions of the individual frames in that low frequency information is more important than high frequency information. In the preferred embodiment of the present invention, more bits are allocated to the low frequency component image than would be allocated using a statistically optimum quantization scheme. This allocation preferentially retains the information most important to a human observer. In addition, fewer bits per pixel are allocated, on average, to the high frequency component images than would be allocated by a statistically optimum quantization scheme. This allocation improves the image compression by selectively degrading the information which is less important to a human observer. In the preferred embodiment of the present invention, some of the highest frequency component images are not quantized at all. The non-quantized component images are discarded. Since the number of pixels in the low frequency component image is a small fraction of the number of pixels in the various high frequency component images, additional compression is obtained for a given degree of subjective image quality.

Referring again to FIG. 1, the component images, after quantization, are transmitted over a bandwidth limited communication channel 16. At the receiving end of the channel, the inverse three-dimensional filter is applied to reconstruct an approximation to the original motion picture by a decompression apparatus 21. The bandwidth limited channel may include storage devices such as magnetic disks or other devices of finite capacity. Hence, the method of the present invention may also be used to store motion pictures in a form requiring less storage medium than would be needed in the absence of compression.

Decompression apparatus 21 performs the inverse of the transformations carried out by compression apparatus 13. The quantized component images are received by an inverse quantizer 19 which generates intensity levels from the quantized values. Inverse quantizer 19 inserts zeros for the pixels of the component images that were not quantized. The resulting three-dimensional component images will be approximations to the original three-dimensional component images produced by filter 14. The intensity values in question are stored in a buffer 18. An inverse perfect reconstruction filter 20 then constructs a single three-dimensional image from the component images. The single three-dimensional image in question is then divided into a plurality of frames which are then outputted as shown at 22.

In general, the three-dimensional filter operates on a three-dimensional image to generate a plurality of three-dimensional component images which may be recombined by the inverse filter to regenerate the original image. The preferred filter creates a low-frequency component image and a plurality of high frequency component images. The low-frequency component image will have an average pixel intensity value that is greater than zero, whereas the average pixel intensity value in the high frequency images will be zero. The high-frequency component images preferably have lower correlation than the original image. In addition, the frequency content of the various high frequency images is preferably different for different sets of high-frequency component images. That is, the collection of high-frequency component images may be organized into groups having component images with different frequency content. Within a group, different component images may emphasize different features of the images. For example, one component image may contain information relating to horizontal lines in the image, while a second component image may have the same frequency content but contain information relating to vertical edges. That is, the high frequency component image emphasizing horizontal edges would contain a line segment at the location of a horizontal edge if the filter preserves local structure.

Finally, it is advantageous to choose filters that are sensitive to the types of spatial and time variations that are normally encountered in motion pictures. It may be shown that the filtering operation described above is equivalent to approximating the original image by a linear superposition of basis functions. That is, an image represented by an array $I_{x,y,t}$ may be approximated by a series of the form $$I_{x,y,t} = \sum_i \sum_j \sum_k \sum_m {}^m C_{i,j,k} {}^m F_{i,j,k}(x,y,t)$$

The set of functions $\{{}^m F_{i,j,k}(x,y,t)\}$ forms a basis for a vector space. The various values of m correspond to the different component images, and the coefficients ${}^m C_{i,j,k}$ are the pixels of the various component images.

For image compression applications, the basis functions preferably have a number of additional properties. First, it is advantageous to utilize an approximation in which the basis functions form an orthonormal basis. It can be shown that an orthonormal basis requires fewer coefficients ${}^m C_{i,j,k}$ to adequately represent the image than a non-orthonormal basis having similar spatial properties. Hence, a filter based on an orthonormal basis concentrates the information in component images having fewer pixels which, in turn, permits a higher compression ratio for any given image quality.

Second, it is advantageous to use a basis in which the basis functions have properties which permit efficient representation of image information found in the motion picture. If this property is satisfied, fewer coefficients ${}^m C_{i,j,k}$ will be needed to adequately represent the image than would be the case if basis functions having properties that are radically different from those of the objects in the motion picture are used. For example, most images, and hence most motion pictures, are made up of objects whose intensity varies smoothly over the object. Hence, a basis in which the basis functions approximate polynomials in the spatial dimensions is desirable. In addition, most motion pictures have edges in the spatial dimensions and include scenes that are relatively constant in time for some period and then suddenly change. Hence, it is desirable to utilize a basis which can adequately approximate edges in space and time. It has been found experimentally that these properties can be adequately satisfied by using basis functions that approximate low order polynomials. In particular, basis functions approximating quadratics or cubics in the spatial dimensions are found to be optimum.

Third, the spatial extent of each basis function should be limited. The portion of the image over which a given basis function is non-zero is referred to as the support of the basis function. If the support of each of the basis functions ${}^m F_{i,j,k}(x,y,t)$ is small compared to the image being approximated, an error in the corresponding coefficient ${}^m C_{i,j,k}$ introduced by the quantization process will only affect a small fraction of the reconstructed image. In this case, random errors in the coefficients will result in noise-like errors in the reconstructed image. If, however, the support of the basis functions is large, a quantization error in a coefficient will lead to an error in the reconstructed image that affects a large fraction of the image. Such errors may appear as stripes or other artifacts. It is known from physiological research that noise-like errors are far less objectionable to a human observer than coherent artifacts such as stripes. Hence, it is advantageous to utilize a filter that corresponds to a functional expansion employing basis functions having limited support.

The manner in which the perfect reconstruction filter and its inverse are constructed will now be explained in more detail. In the preferred embodiment of the present invention, three-dimensional filter 14 is constructed by iteratively applying a one-dimensional perfect reconstruction filter to the three-dimensional image. The preferred filter is a conjugate mirror filter bank that generates two outputs from an input signal comprising a linear sequence of signal values. The outputs in question comprise low-frequency and high-frequency components of the input signal. In the preferred embodiment of the present invention, the filter bank is implemented as digital finite impulse response filters (FIR). Hence, the conjugate mirror filter bank accepts a vector having M components, x(i). If M is not even, a zero is appended to x to force M to be even. The filter bank multiplies the elements of x with the elements of a vector having components a(k), where k runs from 0 to N−1, to form two vectors having components, $y_L(i)$ and $y_H(i)$. These vectors each have M/2 such elements. The components of $y_L(i)$ and $y_H(i)$ are calculated as follows:

$$y_L(2m) = \sum_{k=0}^{N-1} a(k)x(2m - N - k) \quad (1)$$

$$y_H(2m + 1) = \sum_{k=0}^{N-1} a(k)(-1)^{k-1} x(2m + 1 - k) \quad (2)$$

Here, m runs from 0 to (M/2)−1.

The transformations shown in Eqs. (1) and (2) require that some value be assigned to pixels that lie outside the signal range, i.e., x(i) for i<0 or i>M−1. In the preferred embodiment of the present invention, x is assumed to be cyclic, i.e., x(i)=x(i+M). In this case, it can be shown that $y_L$ and $y_H$ each have at most M/2 non-zero components, and the total number of pixels in the various component images will be the same as that in the original image. Other possible assumptions for the values outside the defined range of x(i) will be apparent to those skilled in the art. For example, the values outside the range could be set to zero. In this case, the maximum number of non-zero components will be approximately M/2.

The coefficients a(k) shown in Eqs. (1) and (2) are real or complex numbers that must satisfy the following relationship for the filter bank to be a conjugate mirror filter bank:

$$\sum_{i=0}^{N-1} a^*(i)a(i + k) = 2\delta_{k,0} \quad (3)$$

Here, a(k)=0 for k<0 or k>(N−1), and k is any even integer, and a*(i) denotes the complex conjugate of the (possibly) complex number a(i). It may be shown that filters satisfying Eq. (3) are equivalent to expanding the input signal x(i) in a orthonormal set of basis functions. It can be shown that the three-dimensional filter obtained by the iterative application of such a one-dimensional filter is equivalent to expanding the three-dimensional image in a three-dimensional orthonormal basis of the type discussed above. In addition, for the filter to generate high and low frequency components, the following relationship must be satisfied.

$$\sum_{k=0}^{N-1} a(k) = 2 \quad (4)$$

It may be shown that the support of the basis functions is determined by the number of a(i) which are non-zero. Hence, filters having a small number of weights are preferred. Filters in which the weights satisfy Eqs. (3) and (4) will provide good polynomial approximations if they also satisfy the following system of equations $$\sum_{k=0}^{N-1} (-1)^k k^m a(k) = 0 \quad (4a)$$

for m=0,1,..., D where D is the degree of the desired polynomial approximation. An exemplary set of filter coefficients having N=6 is as follows:

| k | a(k) |
|---|------|
| 0 | .3327 |
| 1 | .8069 |
| 2 | .4599 |
| 3 | −.1350 |
| 4 | −.0854 |
| 5 | .0352 |

In the preferred embodiment of the present invention, each frame of the motion picture to be included in a particular three-dimensional image is first filtered to form a plurality of two-dimensional filtered component images. Corresponding two-dimensional filtered component images in a plurality of these frames are then filtered to form the plurality of three-dimensional filtered component images discussed above.

Figure 2:
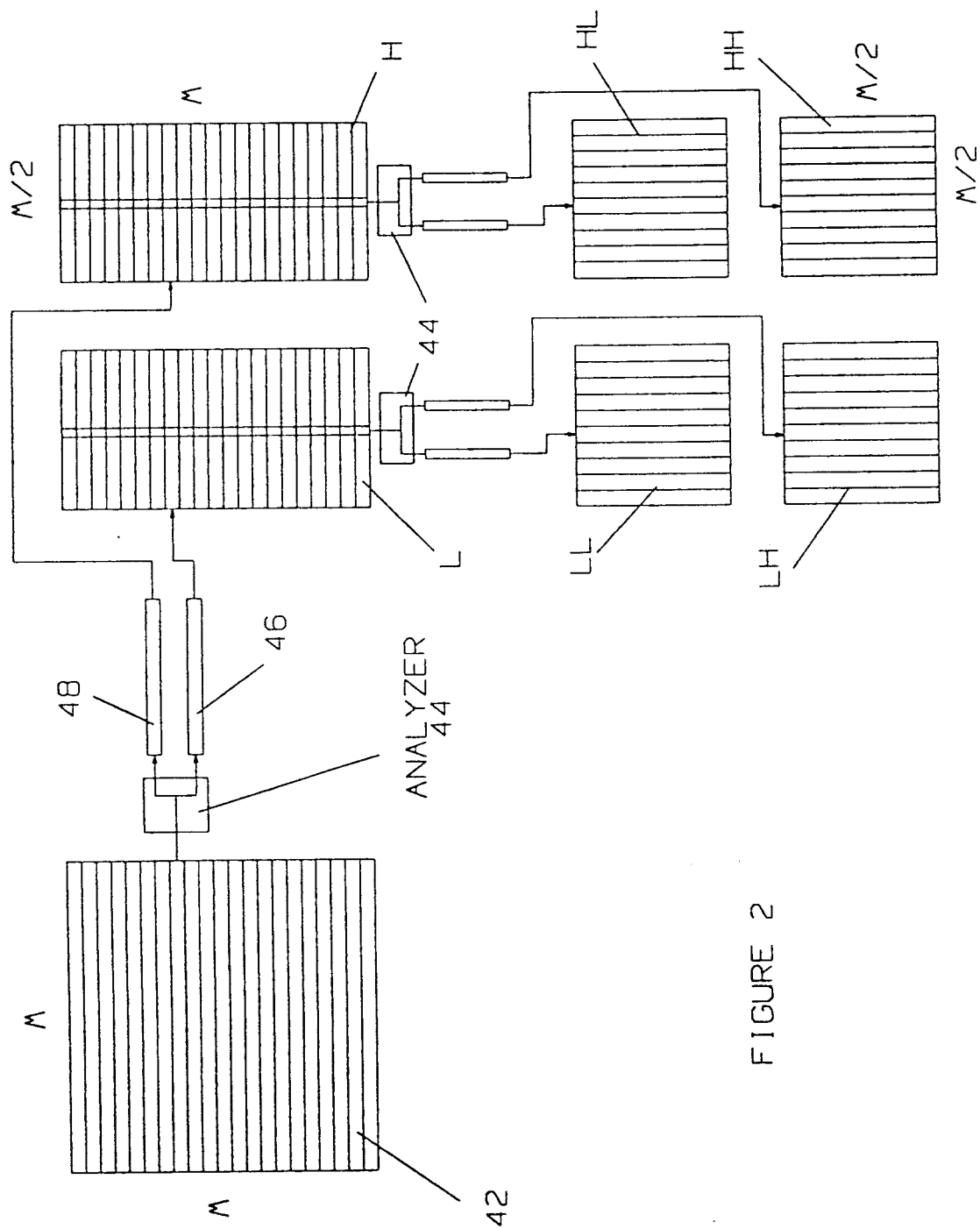
FIG. 2 is a block diagram of an apparatus for filtering each frame of a motion picture to generate a plurality of two-dimensional component images.

The manner in which each frame is coded as a plurality of two-dimensional filtered component images will now be explained with reference to FIGS. 2 and 3. Each frame of the motion picture is assumed to be represented by an array of pixel values having M columns and M rows. The generalization of the method taught below to non-square arrays of pixels will be apparent to those skilled in the art from the following discussion. Each frame is coded by iteration of a two-dimensional filtering transformation. The two-dimensional transformation is carried out by applying a one-dimensional transformation twice as indicated in FIG. 2. In the first step, an image 42 comprising a single frame of the motion picture with M columns and M rows of pixels is transformed into two images denoted by L and H by a filter circuit 44 which will be referred to as analyzer 44. Analyzer 44 comprises a conjugate mirror filter bank as described above. The L and H images each have (M/2) columns and M rows. Each row in the L and H images is generated by filtering the corresponding row in the image 42 through analyzer 44. The high frequency output of analyzer 44 becomes the corresponding row in the H image, and the low frequency output of analyzer 44 becomes the corresponding row in the L image.

In the second step in the transformation, each of the L and H images is further transformed into two (M/2)×(M/2) component images. Image L is used to create two images, LL and LH in a manner analogous to that described above, except that the image is divided into columns instead of rows. Each image is divided into its M element column vectors. Each vector is transformed using Analyzer 44 into two M/2 element column vectors having elements $y_L$ and $y_H$ using the transformation defined in Eq. (1). The vector $y_L$ obtained by transforming the $i^{th}$ column of image L becomes the $i^{th}$ column of image LL. Similarly, the vector $y_H$ becomes the $i^{th}$ column of image LH. The remaining images HL and HH are obtained in an analogous manner.

Upon completion of the transformation, the original frame will have been filtered into four two-dimensional component images having differing spatial frequency characteristics. The LL component image corresponds to the component image representing the low frequency spatial information. The LH component image emphasizes horizontal high frequency information, such as horizontal edges. The HL component image emphasizes vertical high frequency information, and the HH component image emphasizes high frequency information related to edges at 45 degrees and 135 degrees.

As noted above, human observers place more importance on the low frequency information, i.e., the LL component image. If only this component image were retained, and the pixels thereof coded using the same number of bits per pixel as used to code the original frame of the motion picture, an image compression of 4:1 would be obtained. Unfortunately, 4:1 compression ratios are insufficient for most purposes. Further, as will be discussed in more detail below, retention of at least some of the high frequency information is needed to maintain picture quality.

Figure 3:
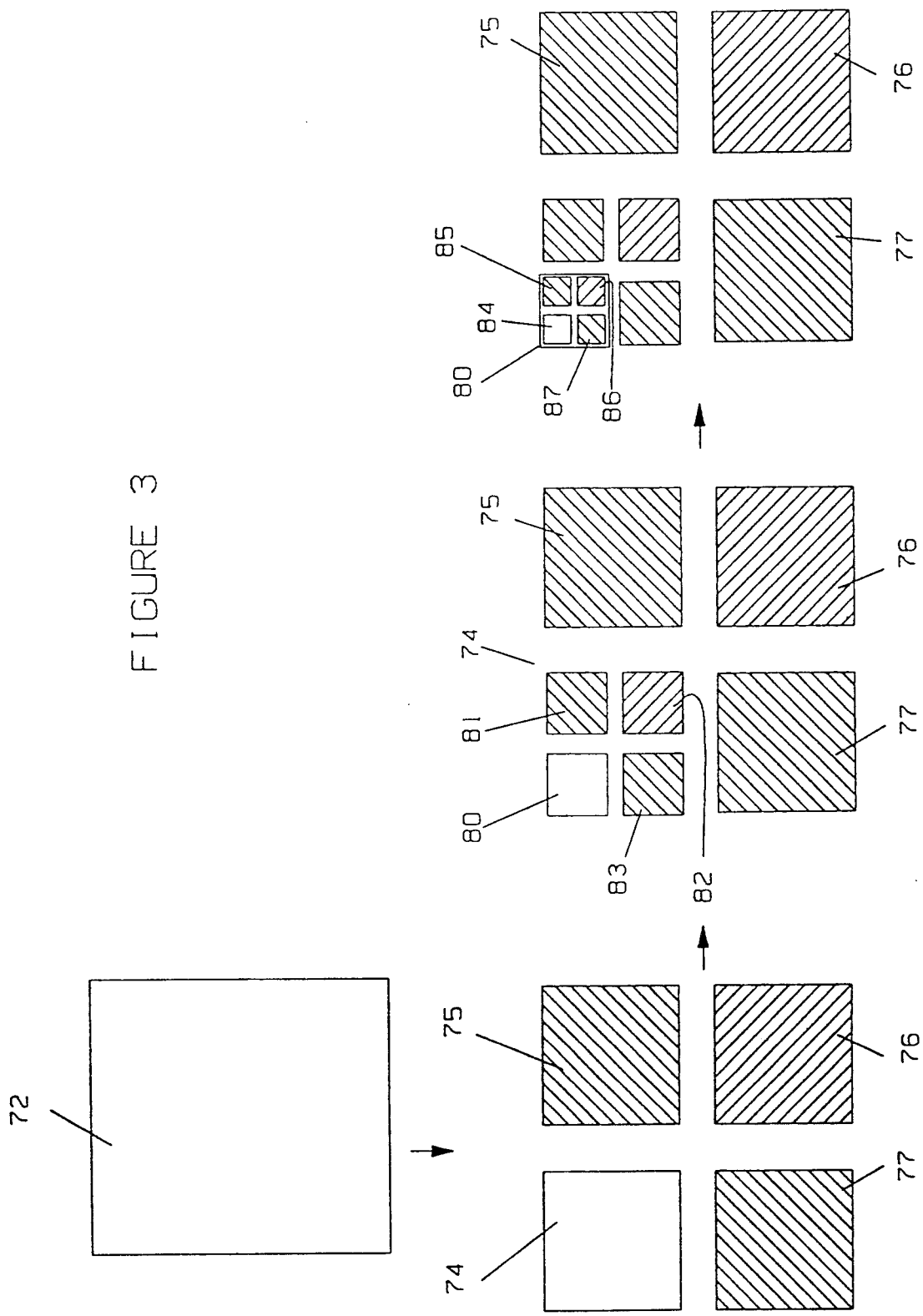
FIG. 3 illustrates the manner in which the apparatus shown in FIG. 2 may be iteratively applied to generate additional two-dimensional component images of having different frequency content.

To increase the compression ratios, the transformation described with reference to FIG. 2 is iterated on the LL image as illustrated in FIG. 3. It will be assumed that the original image 72 has P×P pixels. Image 72 is decomposed into four component images, 74-77, as described above, component image 74 being the LL image. Each of the component images 74-77 are (P/2)×(P/2) pixels.

Next, component image 74 is decomposed into its four component images 80-83, component image 80 being the LL component image. Component images 80-83 each have (P/4)×(P/4) pixels. The iteration continues by decomposing the LL component into its component images at each stage. Hence, at the next stage, component image 80 will be decomposed into component images 84-87. The iteration is continued until the LL image is reduced to some predetermined size.

The frequency characteristics of the various component images will depend on the specific filter coefficients used. In addition, the frequency characteristics will depend on the level of the decomposition at which the component image was generated. For example, component images 75-77 will in general represent higher frequency information than component images 81-83 which in turn will represent higher frequency information than component images 85-87.

It should be noted that the memory space needed to store the image at each stage of the decomposition is the same as that needed to store the original image. While the device shown in FIG. 2 utilized separate memory arrays for the various component images at the different stages of the transformation, it will be apparent to those skilled in the art that the outputs of analyzer 44 can be placed back in the same array used to store the original frame pixel array provided the outputs in question are appropriately buffered.

Figure 4:
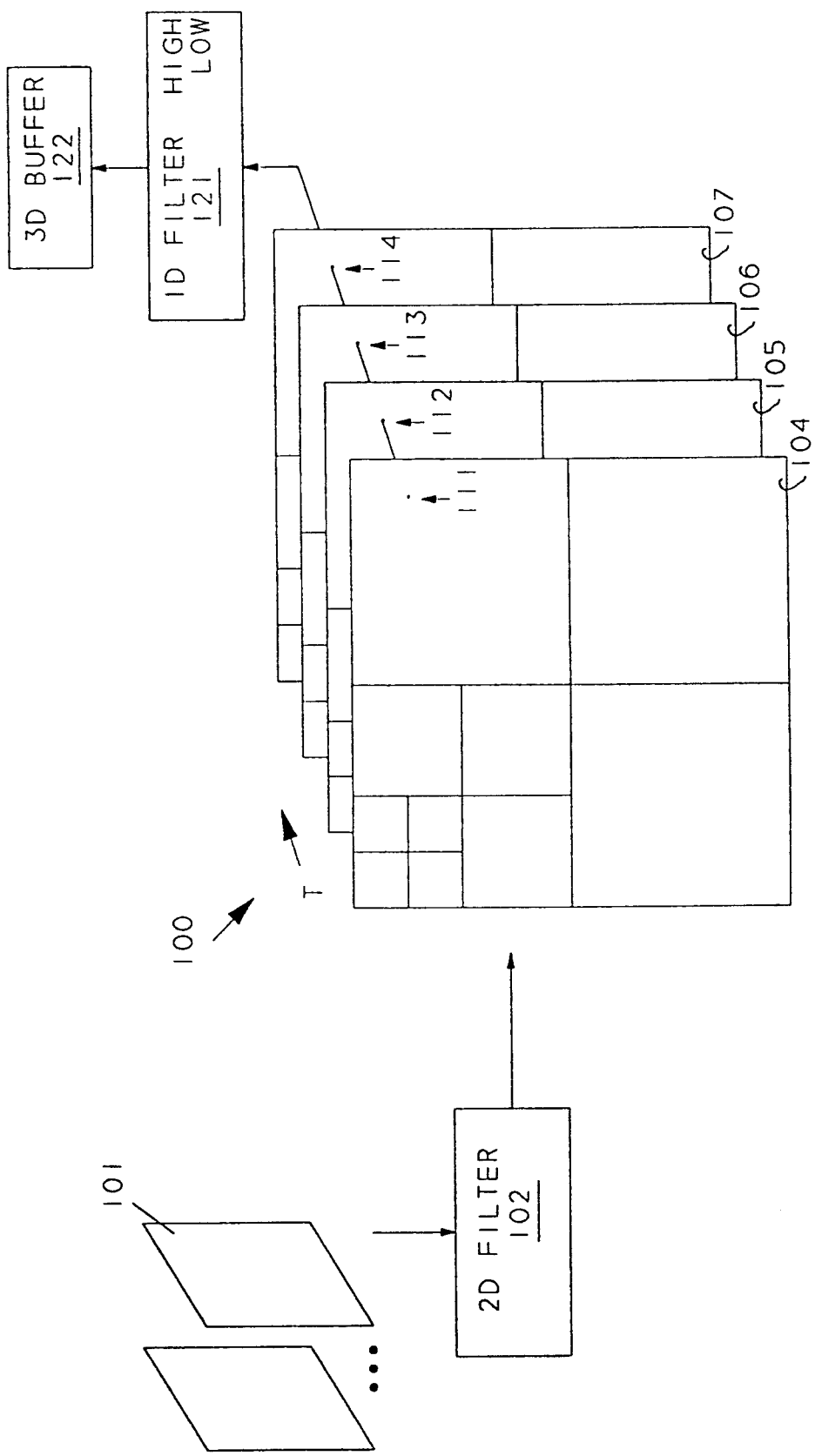
FIG. 4 illustrates the manner in which a two-dimensional filter and a one-dimensional filter are combined so as to generate the three-dimensional filtered component images utilized by the present invention.

Once the single frames making up a given three-dimensional image have been filtered as described above, the filtered two-dimensional component images are combined to generate a set of three-dimensional component images representing the three-dimensional image. An apparatus for generating the three-dimensional filtered component images is shown in FIG. 4 at 100. Coding apparatus 100 receives a sequence of frames 101 which provide the input to a two-dimensional filter 102. Filter 102 operates iteratively on each frame to generate a set of two-dimensional filtered images in a manner analogous to that described above with reference to FIGS. 2 and 3. The output of filter 102 for each frame is stored in a time frame buffer. Exemplary time frame buffers are shown at 104-107. The component images in each time frame buffer are stored such that corresponding pixels are stored at like addresses. A sequence of such pixels is shown at 111-114.

Each sequence of corresponding pixels in the time frame buffers is treated as a one-dimensional digital signal. The digital signal is inputted to a one-dimensional filter 121 which is similar to analyzer 44 shown in FIG. 2. The output of filter 121 comprises the pixels of high and low frequency filtered three-dimensional images. These pixels are stored in a three-dimensional buffer 122. Filter 121 may be applied iteratively to the contents of buffer 122 to provide three-dimensional component images with different degrees of compression in the time-domain in a manner analogous to that described with reference to FIG. 4 above. While a separate buffer 122 is shown for storing the three-dimensional component images, it will be apparent to those skilled in the art that the three-dimensional component images may be stored back in the time component images, may be stored back in the time frame buffers in a manner analogous to that described above with reference to the buffers shown in FIG. 2.

The amount of memory needed to store the three-dimensional component images is determined by the number of taps in filter 121, i.e., the value of N in Eq. (1), and the number of times the time transformation is iterated. If filter 121 is only applied once, i.e., the transformation is not iterated, the number of frames needed for the three-dimensional image will be N. Since the memory need for storing the three-dimensional component images represents a significant fraction of the hardware expense, time-domain transformations with a small N value are preferred. The smallest value of N is 2.

In the preferred embodiment of the present invention, the filtration and quantizing operations are carried out by a pipe-lined processor. The operation of such a processor 200 will now be explained in detail with reference to FIG. 5. The individual frames 201 of a motion picture are received by image compressor 200 one frame at a time. Each time a frame is received from the motion picture, the frame is immediately filtered in two dimensions to form a set of two-dimensional filtered component images. The two-dimensional component images are stored in a time buffer 204. It will be assumed that the time domain filter requires $N_t$ frames from the motion picture to construct the three-dimensional filtered picture. $N_t$ will in general be the number of a(k) values in the one dimensional time domain filter. Hence, the number of time domain buffers must be at least $N_t$.

Figure 5:
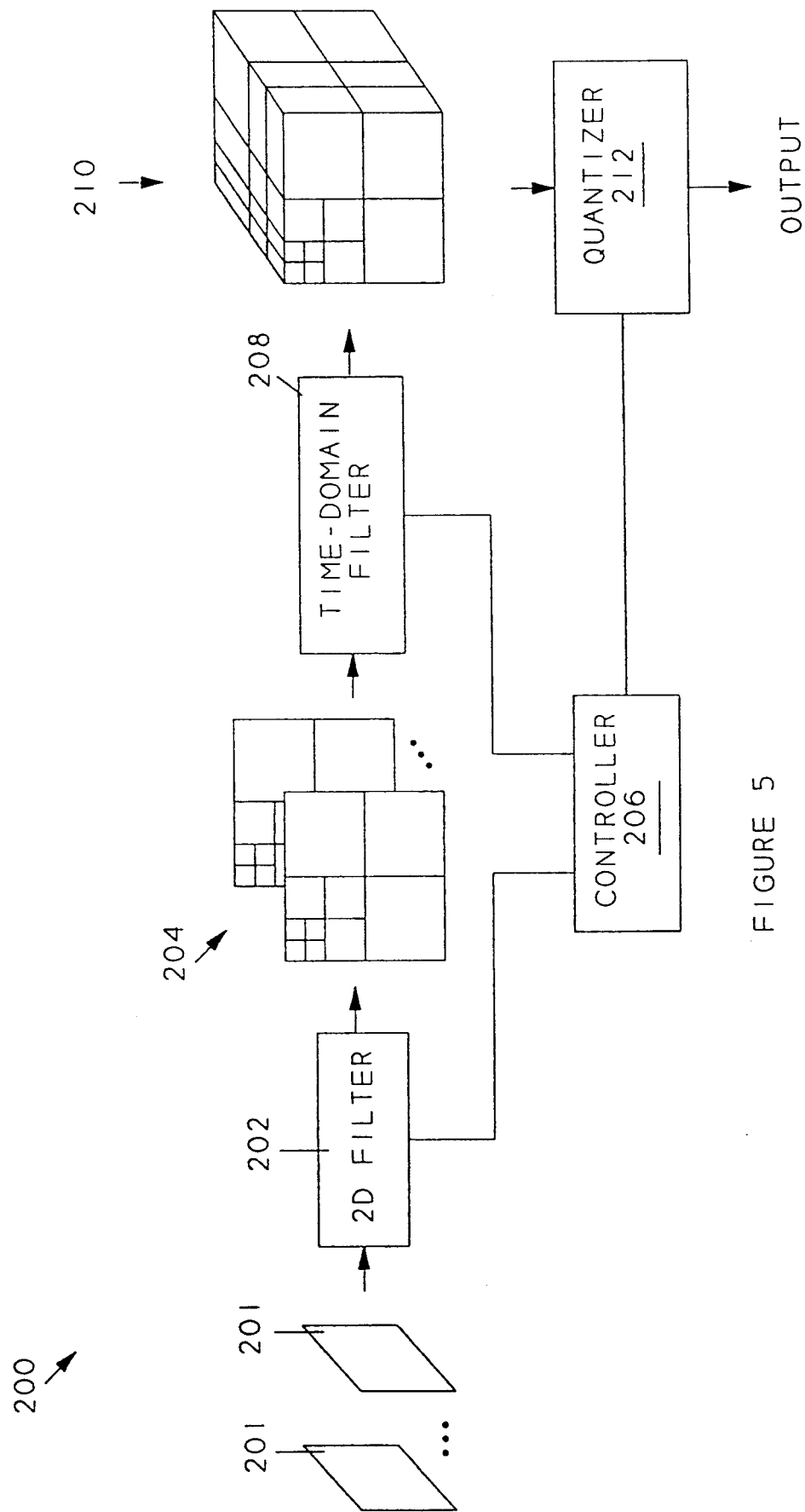
FIG. 5 is a block image compression apparatus according to the present invention.

The second stage of the pipeline requires groups of $N_t$ frames as input. When the two-dimensional component images from $N_t$ frames have been accumulated, the controller 206 causes the one-dimensional time filter 208 to generate the three dimensional component images 210. In the preferred embodiment of the present invention, these component images are stored in the time buffers in which the two-dimensional component images were stored. However, to clarify the present discussion, a separate buffer is shown in FIG. 5. During this process, incoming frames that have been transformed in two dimensions are stored in one or more additional time buffers. The number of additional time buffers depends on the time needed to complete the time domain filtering, quantize the pixels of the filtered three-dimensional component images, and transmit the quantized pixels on the communication link. There must be sufficient buffers to hold all of the two-dimensional filtered component images generated during these operations.

The third stage of the pipeline computes the statistics of the pixel groups to be quantized. In the preferred embodiment of the present invention, controller 206 includes data specifying which pixels are to be examined for possible quantization. In general, the pixels may be viewed as comprising three groups. One group will always be quantized. The low-frequency component image is such a group. The low-frequency component image is typically quantized to a predetermined accuracy that is set independent of the statistics of this component image. This accuracy is sufficiently high to guarantee that quantization errors in this component image will be negligible.

The second group is always ignored. That is, zero bits are allocated to the pixels of this group. With the exception of the high frequency component image discussed below with reference to horizontally scanned and interlaced data, the highest frequency component images are typically ignored.

Finally, there are groups of component images that may be quantized if the group has sufficient power in the component image. Here, the power in a component image is defined to be the sum of the squares of the pixel values for that image. This last class may also include portions of a component image. In the larger component images, it is sometimes advantageous to divide the component image into blocks which are quantized separately. These larger component images represent relatively high frequency information. Only those portions of the component image corresponding to edges in the original image are significant. If the entire component image were to be quantized, a large number of bits would be devoted to the regions having no useful information. If, however, only those regions having a significant number of non-zero pixels, or some other discernable feature such as a line, are quantized, this waste can be reduced. The number of bits allocated to this group of component images depends on the statistics of the pixels in each component image and frequencies represented by each component image. As noted above, higher frequency component images may be quantized utilizing less than the statistically optimum number of bits.

Once the three-dimensional component images have been quantized, the information specifying the quantization transformation is sent over the communication link followed by the quantized pixels. In the preferred embodiment of the present invention, the quantization information is sent first to enable the receiver to reverse the quantization of the pixels as the quantized pixels are received.

The above described embodiments of the present invention have been discussed with reference to monochromatic motion pictures. The manner in which color motion pictures are compressed will now be discussed. Color may be specified either in a RGB format or in a luminance/chrominance format. In the RGB format three frames are specified for each frame of the motion picture, one giving the intensity of red, one giving the intensity of blue, and one giving the intensity of green. In principle, each of these frames may be separately compressed and transmitted over the communication link and decompressed at the receiver. However, the amount of compression obtained is significantly less than that obtained utilizing the preferred embodiment of the present invention and a luminance/chrominance format.

In a luminance/chrominance format, each frame is also represented by three frames. The first frame represents the overall light intensity associated with each pixel of the frame. The remaining two frames, referred to as the chrominance frames, provide color signals which when combined with the luminescence frame generate the RGB frames described above. It is found experimentally that significantly more compression can be applied to the chrominance frames than to the luminance frame. Viewed separately, the chrominance frames would appear of a much poorer quality than the luminance frame; however, when recombined to form RGB frames at the receiver, the lower quality of the color chrominance frames is not apparent to a human observer. As a result, significantly greater overall compression can be accomplished while preserving the apparent image quality of the motion picture. Hence, the preferred embodiment of the present invention operates on a luminance frame and two chrominance frames. If the motion picture is not in this format, appropriate conversion circuitry is incorporated to generate the luminance and chrominance frames from the RGB frames. The manner in which the conversion is accomplished is conventional in the photographic arts, and hence, will not be described in more detail here.

The present invention also makes use of the relationships between the data in the two chrominance frames to further compress the chrominance data. In general, the range of colors in an image is considerably less than the maximum range that would be deduced from the variations in the chrominance images. Images are typically made up of objects of relatively uniform colors. Consider a uniformly colored object. There will be corresponding uniform intensity objects in each of the chrominance frames in the same locations. Hence, the data in the two chrominance frames will be highly correlated in the regions occupied by the object in question. This correlation may be used to further reduce the number of bits needed to store the chrominance information.

Figure 6:
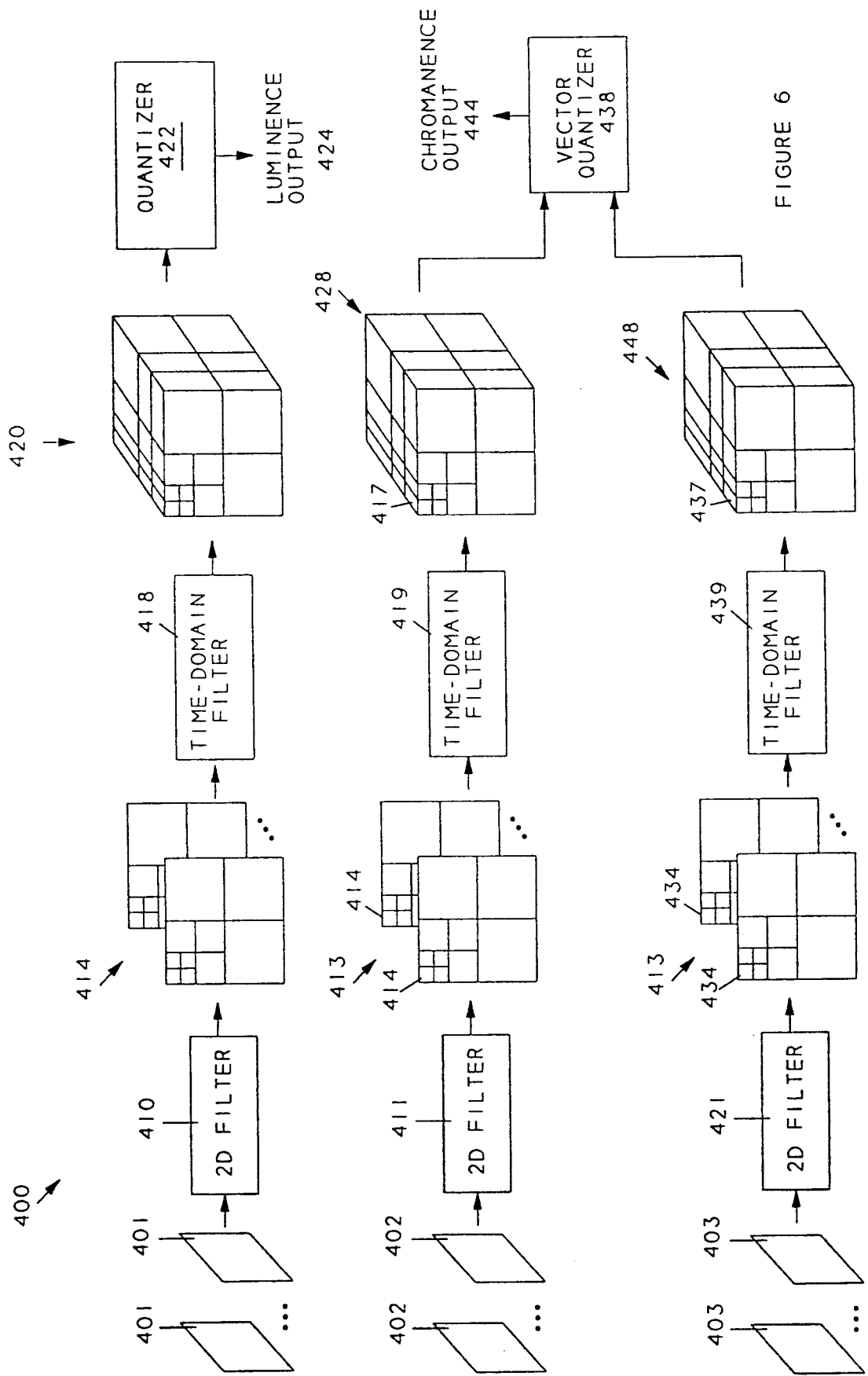
FIG. 6 illustrates the manner in which a color motion picture is compressed by an apparatus according to the present invention.

FIG. 6 illustrates the compression of a motion picture comprising luminance frames 401 and first and second chrominance frames 402 and 403 by a compression apparatus 400 according to the present invention. The luminance frames 401 are compressed in a manner analogous to that described above with reference to FIG. 5. As each luminance frame 401 is received, a two-dimensional filter 410 decomposes the frame into two-dimensional component images. The component images corresponding to each received luminance frame are stored in the next available frame buffer 414. When a predetermined number of luminance frames have been so processed, a time domain filter 418 converts the two-dimensional component images to a plurality of three-dimensional component images which are stored in a buffer 420. The three-dimensional component images in buffer 420 are then quantized by quantizer 422 to form a luminance output signal 424.

The first and second chrominance frames 402 and 403 corresponding to the luminance frames received by filter 410 are processed by two-dimensional filters 411 and 421 in an analogous manner to generate two-dimensional chrominance component images which are stored in frame buffers 424 and 434. In the preferred embodiment of the present invention, only the low-frequency component images which are shown at 425 and 435 are actually generated and subjected to the subsequent processing. When the above mentioned predetermined number of frames have been received, time-domain filters 419 and 439 convert the two-dimensional chrominance component images to three-dimensional component images which are stored in buffers 428 and 448. In the preferred embodiment of the present invention, only the low-frequency chrominance three-dimensional component images shown at 417 and 437 are actually generated and subjected to the subsequent processing.

The degree of compression applied to the first chrominance frames is the same as that applied to the second chrominance frames; hence, the component images stored in buffers 428 and 448 have corresponding pixels. Each pair of corresponding pixels may be considered to be components of a two-dimensional vector. That is, a single vector valued component image is created from each of the corresponding component images in buffers 428 and 448. These vector valued component images are then quantized by vector quantizer 438 to form a chrominance output signal 444. Because of the above-mentioned correlation between the first and second chrominance frames, the number of vector values actually realized in the motion picture is considerably less than the product of the numbers of values realized in each chrominance frame. As a result, the number of bits needed to represent the chrominance data is significantly reduced.

Before describing the manner in which motion pictures compressed by the present invention are decompressed, the manner in which interlaced motion picture images are preferably compressed will be described. An interlaced motion picture may be regarded as a motion picture with frames having half the number of horizontal scan lines in which every other frame is offset by half the line spacing in the vertical direction. In effect, each frame fills in the spaces between the lines of the previous frame. In principle, each of the frames may be treated as individual frames of the motion picture and compressed as described above. However, a significant improvement in compression can be obtained if the frames are combined to form a single frame having twice the number of scan lines which is then compressed.

The amount of compression that may be obtained is dependent on the amount of redundant information in a frame. There is considerably more redundant information in successive frames of an interlaced sequence than in a single frame; hence, improved compression may be obtained. Unfortunately, it is found experimentally that merely combining two successive frames and compressing the combined frame leads to unacceptable artifacts. In particular, certain fine-grained background which is stationary in the original motion picture sequence appears to vibrate back and forth in the decompressed motion picture. It has been found experimentally that this artifact can be alleviated by preferentially quantizing certain high frequency information that would otherwise not be quantized at all or at most only with limited accuracy.

Figure 7:
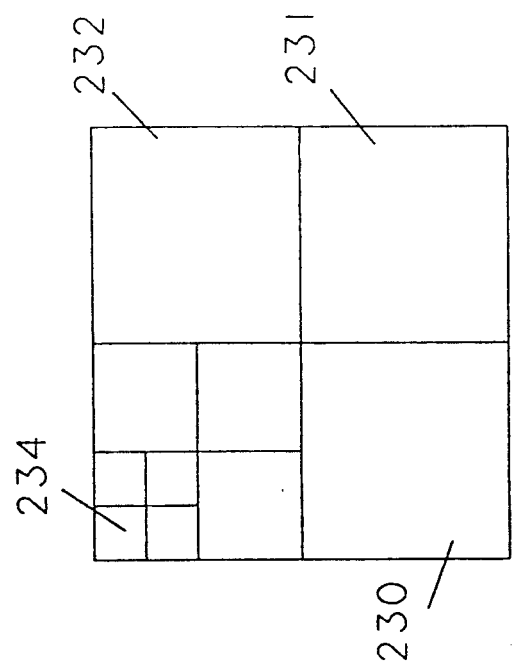
FIG. 7 illustrates the manner in which a single frame of a non-interlaced motion picture is filtered.

Consider the two-dimensional decomposition of a frame into two-dimensional filtered component images as described above with reference to FIG. 3. After decomposition, the two-dimensional component images are organized into a hierarchy as shown in FIG. 7. The first level of decomposition generates three high frequency component images shown at 230-232. Component image 230 emphasizes high frequency information relating to horizontal edges, component image 232 emphasizes high frequency information relating to vertical edges, and component image 231 emphasizes high frequency information related to diagonal edges. Normally, these component images would be discarded or at most certain blocks of pixels therein quantized to limited precision.

Figure 8:
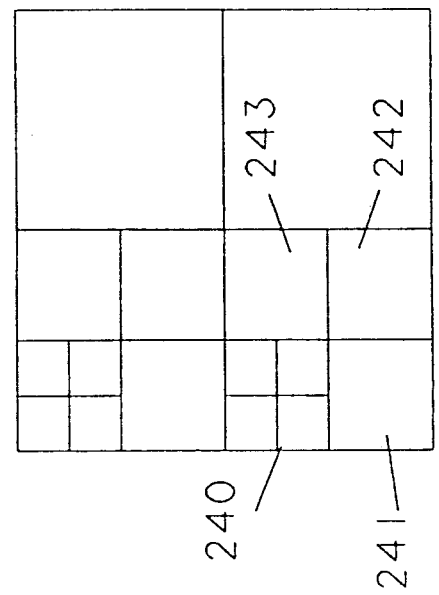
FIG. 8 illustrates the manner in which a single frame of an interlaced motion picture is filtered.

When the image consists of interlaced scan data, component image 230 corresponding to edges in the horizontal direction, i.e., the direction of the scan in the interlaced data, is selectively filtered and a portion of the data retained. Referring to FIG. 8, component image 230 is filtered in two-dimensions in a manner analogous to the filtering of the first low-frequency component image 234 shown in FIG. 6. That is, component image 230 is input to a two-dimensional filter and the resulting four component images stored back in the same portion of the two-dimensional array as originally used for storing component image 230. The resulting four component images are shown at 240-243 of FIG. 7. The process is iterated on the low-frequency component image generated by each filtration pass. At the completion of the process, the original image will have been decomposed into two hierarchical sets of component images and the original high frequency component images shown at 231 and 232 in FIG. 7.

In the preferred embodiment of the present invention, component images 231 and 232 are not quantized at all. These component images are discarded. The component images derived from component image 230 and the high-frequency component images derived from component image 234 are quantized to a precision that depends on the variance of the particular component image and the original component image from which it was derived. The component images derived from component image 230 are quantized to a precision which is less than the precision that would be dictated by an optimum quantization algorithm. The high-frequency component image derived from component image 234 are quantized at the optimum level. The low-frequency component image derived from component image 234 is quantized to a much higher precision than that dictated by an optimum quantization algorithm.

The motion pictures compressed by the compression method of the present invention can be decompressed by reversing the quantization steps and then combining the various filtered three-dimensional component images utilizing the inverse of the FIR filter banks used to generate the component images. Since the inverse filter banks combine two component images to form a single image, the inverse filter banks will be referred to as synthesizers.

In the preferred embodiment of the present invention, the synthesis is accomplished by iteratively applying one-dimensional synthesizers. A one dimensional synthesizer operates on the high and low frequency vectors generated by the conjugate mirror filter bank described above to form a signal vector whose high and low frequency components are the high and low frequency vectors in question. If the components of the low and high frequency vectors are denoted by $x_L(i)$ and $x_H(i)$, respectively, the synthesizer generates an output vector having components $z(i)$. The number of components in the output vector is twice that in each of the input vectors. The output vector is calculated as follows:

$$z(2m) = \sum_{k=0}^{N/2-1} a(2k)x_L[m - (N/2) - k] - \qquad (5)$$

$$\sum_{k=0}^{N/2-1} a(2k - 1)x_H(m - k)$$

$$z(2m + 1) = \sum_{k=0}^{N/2-1} a(2k - 1)x_L[m - (N/2) - k] - \qquad (6)$$

$$\sum_{k=0}^{N/2-1} a(2k)x_H(m + k)$$

Here, the a(k) are the filter coefficients used by the filter bank that generated the high and low frequency vectors $x_H$ and $x_L$.

As noted above, the decompression process is begun by first reversing the quantization transformation. If a particular component image was discarded prior to quantization, the component image in question is replaced by a component image of the appropriate size in which all of the pixel values are zero. Since the various component images were quantized to differing degrees of precision, the resultant filtered three-dimensional component images are only an approximation to the three-dimensional component images generated from the sequence of frames received by the transmitter.

Figure 9:
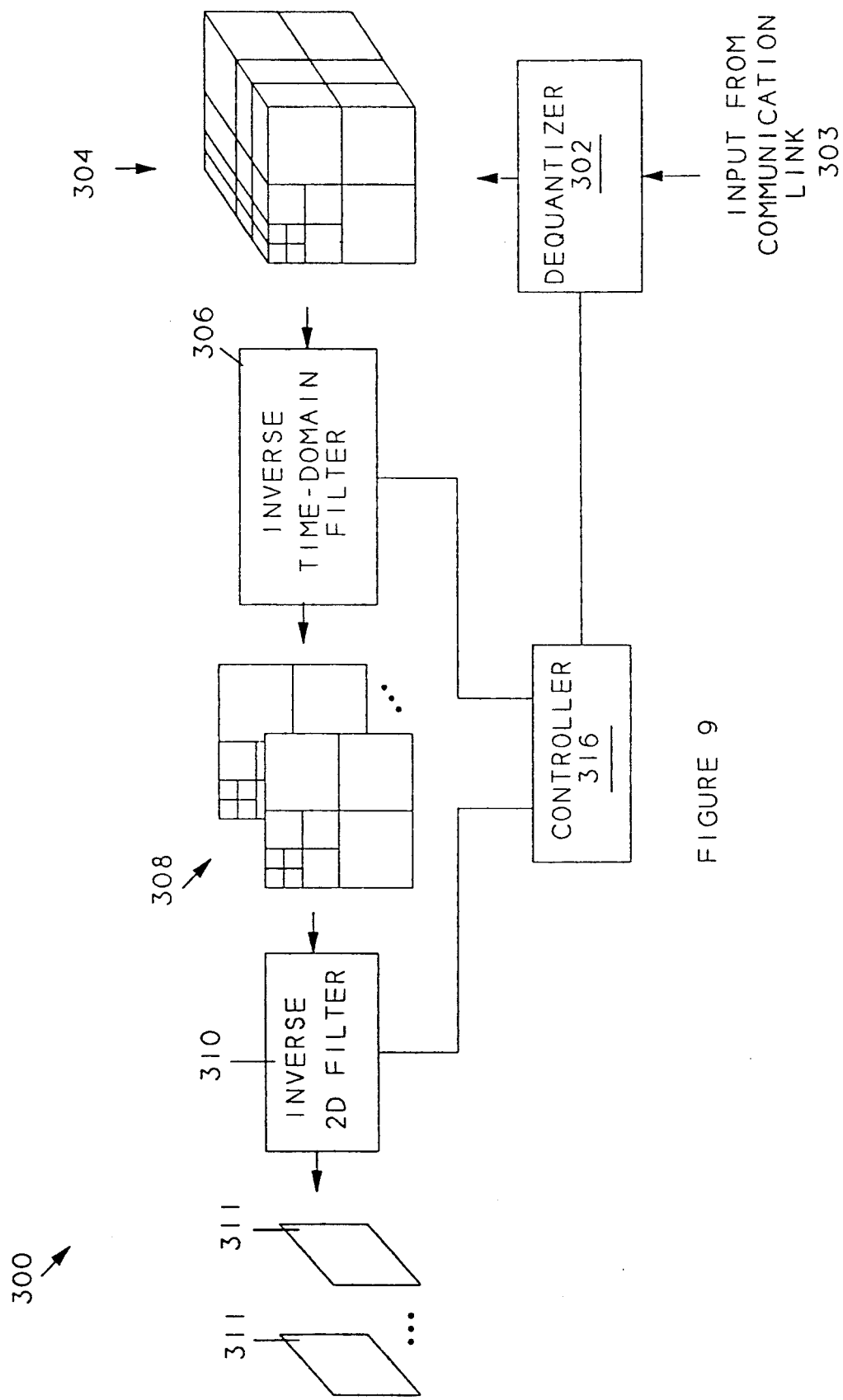
FIG. 9 illustrates the manner in which a motion picture that has been compressed by the method of the present invention is decompressed.

As apparatus for decompressing the motion picture is shown at 300 in FIG. 9. Approximations to three-dimensional component images are generated from the quantized data received by dequantizer 302 which receives data from the bandwidth limited communication channel 303. The three-dimensional component images are stored in a buffer 304. The filtering transformation are reversed using the appropriate synthesizers to generate a sequence of frames which approximates the frames used to construct the original three-dimensional image. First, a one-dimensional time domain synthesizer is used to generate a plurality of two-dimensional filter component images which are stored in time buffers 306. The time buffers can be the same as the buffers used to store the three-dimensional component images. However, for clarity, separate buffers are shown. Each time buffer 306 stores the two-dimensional filtered component images needed to generate one frame of the motion picture after the time domain synthesizer has acted. The contents of each buffer are then iteratively passed through synthesizer 310 which combines the various component images into a single two-dimensional image which is outputted from apparatus 300.

Apparatus 300 is preferably constructed as a pipelined processor. In the first stage of the processor, dequantization takes place and the three-dimensional filtered component images generated. The second stage of the processor reverses the time domain transformation. The third stage of the processor generates a motion picture frame from each of the sets of two-dimensional component images.

The apparatus shown in FIG. 9 may be replicated for the purpose of decompressing color images that have been compressed by the method described above. In this case, the apparatus shown in FIG. 9 would be used to decompress the luminace image. The version used to decompress the chrominance images would contain two such apparatuses and a dequantizer that unpacks the quantized vector data placing the different components of the vectors in the buffers analogous to buffer 304 described with reference to FIG. 9.

It should be noted that additional compression of the quantizer output in the present invention may be obtained by using conventional arithmetic coding schemes to eliminate any redundancy in the quantizer output. Such schemes replace repeated sequences of values by codes requiring fewer bits than the sequence in question. It is to be understood that the quantizers and dequantizers described above may also include such coding schemes. Vector coding schemes are also known to those skilled in the art and may be applied to the vectors generated from the chrominance component images.

As pointed out above, the bandwidth limited communication channel may include some means for storing the compressed motion picture such as magnetic tape or computer disk storage. Hence, the present invention may be utilized to generate a recording of a motion picture in a compressed format. Such recordings may be duplicated in the compressed format and disseminated to end users equipped with the appropriate decompression apparatuses.

Such a recording would include means such as a magnetic or optical storage medium for storing a plurality of digital values. The digital values would be divided into groups in which each group would include approximations for the pixels of one or more component images, each such component image specifying a three-dimensional image. Each of the three dimensional image would include information specifying two or more frames of the motion picture. The component images according to this embodiment of the present invention would include a low-frequency component image and one or more high-frequency component images. In the preferred embodiment of this recording, each group would also include digital values specifying two-dimensional chrominance vectors as described above. If the recording had been derived from an interlaced scanning device, each group would also include a high frequency component image emphasizing horizontal image features in the frames of said motion picture.

There has been described herein a novel apparatus and method for compressing and decompressing motion pictures. Various modifications to the present invention will become apparent to those skilled in the art from the foregoing description and accompanying drawings. Accordingly, the present invention is to be limited solely by the scope of the following claims.

What is claimed is:

1. An apparatus for compressing a motion picture comprising a sequence of frames, each said frame comprising a two-dimensional image representing said motion picture at one instance in time, said apparatus comprising:
   means for receiving a signal specifying a compression ratio for said motion picture;
   means for receiving signals specifying said frames;
   means for storing a predetermined number, $N_t$ of consecutively received said frames;
   three-dimensional filtering means for filtering said stored frames to generate a plurality of three-dimensional component images, said plurality of three-dimensional component images comprising a low-frequency component image and one or more high-frequency component images, each said component image comprising a plurality of pixel values; and
   quantization means for approximating each pixel values in at least one of said component images by an approximation comprising one of a predetermined set of integer values, the precision of said integers being related to the statistical distribution of the pixel values in said component image and said received compression ratio; and means for generating output signals specifying said pixel approximations.

2. The motion picture compression apparatus of claim 1 wherein said quantization means comprises means for approximating the pixels of said low-frequency image to a precision greater than the statistically optimum precision determined by said statistical distributions of said pixels in said component images and said received compression ratio; and means for approximating said pixels of at least one of said high frequency component images to a precision less than the statistically optimum precision determined by the statistical distributions of said pixels in said component images and said received compression ratio.

3. The motion picture compression apparatus of claim 1 wherein said frames of said motion picture comprise interlaced frames, every other said frame being offset by one half the horizontal line spacing of said frames, wherein said receiving means comprises means for combining each pair of consecutively received frames to form a single frame having twice the number of horizontal lines, wherein said three-dimensional filtering means comprises means for generating at least one high frequency component image emphasizing horizontal edges in said frames of said motion picture, and wherein said quantization means comprises means for approximating the pixels of said high frequency component image emphasizing horizontal edges to a precision greater than said statistically optimum precision determined by the statistical distribution of said pixels in said high-frequency component image emphasizing horizontal edges.

4. The motion picture compression apparatus of claim 1 wherein each said frame of said motion picture comprises a luminance frame and first and second chrominance frames, wherein said three dimensional filtering means further comprises first and second three-dimensional chrominance filtering means, said first three-dimensional chrominance filtering means comprising means for filtering $N_f$ of said first chrominance frames to generate a first set of three-dimensional filtered chrominance component images, said second three-dimensional chrominance filtering means comprising means for filtering the $N_f$ said second chrominance frames corresponding to $N_f$ of said first chrominance frames filtered by said first three-dimensional chrominance filtering means to generate a second set of three-dimensional filtered chrominance component images, and wherein said quantization means further comprises vector quantization means for approximating corresponding pixels in said first and second three-dimensional filtered chrominance component images by vectors of a predetermined precision.

5. The motion picture compression apparatus of claim 1 wherein said receiving means comprises:

two-dimensional filtering means for filtering each of said received frames to generate a two-dimensional low-frequency component image and one or more two-dimensional high frequency component images, each said component image comprising a plurality of pixel values, wherein said storing means comprises a plurality of frame buffers, each said frame buffer comprising means for storing said component images generated from one of said consecutively received frames, and wherein said three-dimensional filtering means comprises a one-dimensional filtering means for combining corresponding pixels in said frame buffers.

6. The motion picture compression apparatus of claim 5 wherein said two-dimensional filtering means comprises a one-dimensional conjugate mirror filter bank.

7. An apparatus for decompressing a compressed motion picture, said compressed motion picture comprising a sequence of approximations for the pixels of one or more three-dimensional images, said decompression apparatus comprising:

means for receiving a signal specifying said pixel approximations;

means for generating one or more three-dimensional component images from said received pixel approximations including means for generating blank pixel values for any said pixel value not received;

inverse three-dimensional filtering means for combining said three-dimensional component images to generate a plurality of two-dimensional luminance picture frames;

means for generating output signals specifying said generated luminance picture frames;

8. The motion picture decompression apparatus of claim 7 wherein said pixel approximations comprise a plurality of two dimensional vector values, the components of each said vector value specifying first and second chrominance pixel values, wherein said means for generating three-dimensional component images comprises means for assembling said first and second chrominance pixel values into first and second sets of chrominance component images, and wherein said inverse three-dimensional filtering means further comprises means for combining said first and second sets of chrominance component images into first and second two-dimensional chrominance picture frames, and wherein said output signal generating means further comprises means for outputting said chrominance picture frames.

9. A method for compressing a motion picture to a given compression ratio, said motion picture comprising a sequence of frames, each said frame comprising a two-dimensional image representing said motion picture at one instance in time, said apparatus comprising:

receiving signals specifying said frames;

storing a predetermined number $N_f$ of consecutively received said frames;

filtering said stored frames to generate a plurality of three-dimensional component images, said plurality of three-dimensional component images comprising a low-frequency component image and one or more high-frequency component images, each said component image comprising a plurality of pixel values; and approximating each pixel values in at least one of said component images by an approximation comprising one of a predetermined set of integer values, the precision of said integers being related to the statistical distribution of the pixel values in said component image and said compression ratio; and generating output signals specifying said pixel approximations.

10. The method of claim 9 wherein said approximating step comprises approximating the pixels of said low-frequency image to a precision greater than the statistically optimum precision determined by said statistical distributions of said pixels in said component images and said compression ratio: and approximating said pixels of at least one of said high frequency component images to a precision less than the statistically optimum precision determined by the statistical distributions of said pixels in said component images and said compression ratio.

11. The method claim 9 wherein said frames of said motion picture comprise interlaced frames. every other said frame being offset by one half the horizontal line spacing of said frames, wherein said receiving step comprises combining each pair of consecutively received frames to form a single frame having twice the number of horizontal lines. wherein said three-dimensional filtering step comprises generating at least one high frequency component image emphasizing horizontal edges, and wherein said approximating step comprises approximating the pixels of said high frequency component image emphasizing horizontal edges to a precision greater than said statistically optimum precision determined by the statistical distribution of said pixels in said high-frequency component image emphasizing horizontal edges.

12. The method of claim 9 wherein each said frame of said motion picture comprises a luminance frame and first and second chrominance frames, wherein said filtering step further comprises filtering $N_f$ of said first chrominance frames to generate a first set of three-dimensional filtered chrominance component images, filtering the $N_f$ said second chrominance frames corresponding to said $N_f$ said first chrominance frames to generate a second set of three-dimensional filtered chrominance component images, and wherein said approximating step approximating corresponding pixels in said first and second three-dimensional filtered chrominance component images by vectors of a predetermined precision.

13. The method claim 9 wherein said receiving step comprises:
filtering each of said received frames to generate a two-dimensional low-frequency component image and one or more two-dimensional high frequency component images, each said component image comprising a plurality of pixel values, wherein
said storing step comprises storing said two-dimensional component images in a plurality of frame buffers, each said frame buffer comprising means for storing said component images generated from one of said consecutively received frames, and wherein
said filtering step comprises combining corresponding pixels in said frame buffers.

14. The method of claim 13 wherein said two-dimensional filtering step comprises filtering said pixels with a one-dimensional conjugate mirror filter bank.

15. A recording of a motion picture comprising a plurality of ordered frames, said recording comprising means for storing a plurality of digital values, said digital values being divided into groups, each said group comprising approximations for the pixels of one or more component images, said component images specifying a three-dimensional image, each said three dimensional image comprising information specifying two or more frames of said motion picture, said component images comprising a low-frequency component image and one or more high-frequency component images.

16. The recording of claim 15 wherein each said group further comprises digital values specifying two-dimensional chrominance vectors, said chrominance vectors specifying first and second three-dimensional chrominance component images, said first and second chrominance component sub-images specifying a first and second three-dimensional chrominance images.

17. The recording of claim 15 wherein each said group comprises a high frequency component image emphasizing horizontal image features in the frames of said motion picture.

* * * * *

UNITED STATES PATENT AND TRADEMARK OFFICE
CERTIFICATE OF CORRECTION

PATENT NO. : 5,121,191
DATED : June 9, 1992
INVENTOR(S) : Cassereau, et al.

It is certified that error appears in the above-identified patent and that said Letters Patent is hereby corrected as shown below:

Title page:

Item, [56] *Attorney, Agent, or Firm* - delete "Bartles" and insert therefor --Bartels--.

Item, [73] Assignee - delete "Combridge" and insert therefor --Cambridge--.

Column 2, line 52, after "amount" insert --equal--.

Column 12, lines 19 and 20, delete "maybe stored back in the time component images,".

Column 17, line 28, delete "As" and insert therefor --An--.

[57] Abstract - delete "derrived" and insert therefor --derived--.

Column 2, line 55, after "as" insert --a--.

Column 10, line 57, delete "Analyzer" and insert therefor --analyzer--.

Column 18, line 27, delete "image" and insert therefor --images--.

Column 18, line 67, delete "values" and insert therefor --value--.

Column 20, line 25, delete ";" and insert therefor --.--.

Column 20, line 56, delete "values" and insert therfor --value--.

Column 21, line 7, after "method" insert --of--.

Signed and Sealed this

Twenty-eighth Day of September, 1993

Attest:

BRUCE LEHMAN

*Attesting Officer*    Commissioner of Patents and Trademarks